(12) United States Patent
Wealleans

(10) Patent No.: US 8,291,843 B2
(45) Date of Patent: Oct. 23, 2012

(54) DRILLING APPARATUS AND METHOD

(76) Inventor: Shaun Wealleans, York (GB)

( * ) Notice: Subject to any disclaimer, the term of this patent is extended or adjusted under 35 U.S.C. 154(b) by 0 days.

(21) Appl. No.: 13/125,062

(22) PCT Filed: Oct. 20, 2009

(86) PCT No.: PCT/GB2009/051405
§ 371 (c)(1),
(2), (4) Date: May 20, 2011

(87) PCT Pub. No.: WO2010/049720
PCT Pub. Date: May 6, 2010

(65) Prior Publication Data
US 2011/0209649 A1  Sep. 1, 2011

(30) Foreign Application Priority Data

Oct. 27, 2008 (GB) .................................. 0819601.6

(51) Int. Cl.
*A01B 49/06* (2006.01)
*A01C 5/06* (2006.01)

(52) U.S. Cl. ........ 111/147; 111/148; 111/152; 111/165; 111/167; 111/194; 111/195; 172/699

(58) Field of Classification Search ................. 111/148, 111/147, 152, 163–165, 167, 190, 191, 194, 111/195; 172/699
See application file for complete search history.

(56) References Cited

U.S. PATENT DOCUMENTS
2,734,439 A    2/1956 Padrick

FOREIGN PATENT DOCUMENTS
FR    2839608 A1    11/2003
GB    1150723 A     4/1969
WO    WO-2004/078053 A2    9/2004
WO    WO-2004/086849 A1    10/2004

OTHER PUBLICATIONS

Oltra Garcia, R., "International Search Report", for PCT/GB2009/051405 as mailed Feb. 8, 2010, 7 pages.

*Primary Examiner* — Christopher J. Novosad
(74) *Attorney, Agent, or Firm* — Winstead PC

(57) ABSTRACT

An apparatus for the cultivation of soil and the planting of seeds is described comprising a frame (8); a first row of deep loosening tines (4) carried by the frame and spaced apart across at least a major part of the width of the frame (8); and a second row of drill coulters (5) carried by the frame (8) and spaced apart across at least a major part of the width of the frame, —wherein a deep loosening tine (4) of the first row is aligned with at least one pair of drill counters (5) of the second row, in such a manner that each coulter (5) of the pair is laterally offset either side of the deep loosening tine (4). A method for the cultivation of soil and the planting of seeds using such an apparatus is also described.

14 Claims, 4 Drawing Sheets

DRILLING APPARATUS AND METHOD

The invention relates to a seed drilling apparatus and seed drilling method, for example for application in agriculture and horticulture, that incorporates a capability for deep cultivation of the land immediately prior to placing the seed.

A typical method for the planting of seed involves the provision of an apparatus assembly structured to be drawn across an area of cultivated soil to sow or plant seed into the soil in a plurality of parallel spaced apart rows using seed drilling units, supported on a suitable frame and carriage means, to supply seed to the parallel spaced apart rows. Such a carriage means may be self propelled but is usually adapted to be towed by a tractor or the like.

A known seed drilling unit for use in such an apparatus assembly comprises a drill or seed coulter or seed boot. Typically, a plural array of drill coulters is set up on a suitable support and drawn through the soil to be planted, thus drilling the seed into a plurality of parallel spaced lines as the apparatus is drawn through the soil. A drill or seed coulter or seed boot typically comprises two components. It first comprises a soil working portion making contact with the ground in a forward position relative to a drawing direction, and typically comprising a bladed tine, and/or a soil cutting disc, which cuts into the soil surface in a furrowing action and creates a planting furrow or trough of suitable, and ideally adjustable, depth into which seed can be drilled. It additionally comprises a seed supply means, in communication with a suitable seed storage hopper or the like, positioned rearwardly of this soil working portion (or at least rearwardly of the part thereof making first contact with the soil), to drill seed from a seed supply stock, for example under pneumatic urging via blowing means, into the planting furrow produced by the soil working portion.

A typical seed drill apparatus comprises of plural array of such drill coulters on a suitable support frame to drill a plurality of parallel furrows in use.

Even in the typical case where a seed drilling unit comprises a drill coulter with a soil working portion such as a tine or disc in addition to a seed supply means, the soil working portion generally acts only on a shallow depth of soil to create a planting furrow into which seed can be delivered at an appropriate planting depth. It might be desirable first to subject the planting substrate to a prior deeper level cultivation. Although this can simply be carried out by prior operation, for example using a plough, it is generally desirable to reduce the total number of passes required to prepare and drill a field.

A combination apparatus may therefore include an additional array of soil working units and for example an array of cutting tines, in series with the drill coulter array, and for example mounted forwardly thereof so as to make contact with and work the soil in advance of the drill coulter array in a single pass. In particular, it may be desirable to work the soil to a relatively deeper level, especially if it has not been previous ploughed. The apparatus may therefore include an array of deep level soil working units, for example an array of deep digging/deep loosening tines, mounted forwardly of the drill coulter array so as to work the soil in advance of the drill coulter array.

Such an arrangement is described for example in International patent publication WO2004/086849, where the apparatus includes a first and second series of tines mounted on a frame adapted to be carried to the rear of a tractor, with the first series of tines acting initially to effect a deeper level cultivation of the soil to create v-shaped troughs of loosened soil, and the second row of tines acting with a seed delivery means to drill the seed directly in line behind. In other words, the first tines are simple digging tines, and the second tines comprise the soil working parts of drill coulters or seed boots.

However, the placement of one row of seed immediately behind each deep loosening tine is not always beneficial. This might particularly be an issue for example where the seed to be sown requires only a shallow furrow to allow successful germination of the seed. The depositing of such a seed from a coulter aligned directly behind the deep loosening tine results in the sown seed being introduced in to the deepest part of the trough created by the deep loosening, and this may result in sub-optimal seed germination, resulting in low yields of crops or other plants. This might also be an issue where for example, as will often be the case, it is desirable to sow seed rows at a greater density (or closer spacing) than the spacing of the deep loosening tine, thus allowing multiple rows of seeds to be placed at an optimised depth of soil to facilitate the seed germination, and therefore plant yield. It follows that both the optimum depth and the optimum spacing of a deep loosened furrow and a seed row might differ, which the direct alignment of tines in WO2004/086849 makes difficult to accommodate.

Thus, according to the first aspect of the present invention there is provided an apparatus for the cultivation of soil and the planting of seeds comprising;

a frame;

a first row of deep loosening tines carried by the frame and spaced apart across at least a major part of the width of the frame; and a second row of drill coulters carried by the frame and spaced apart across at least a major part of the width of the frame;

wherein a deep loosening tine of the first row is aligned with at least one pair of drill coulters of the second row, in such a manner that each coulter of the pair is laterally off set either side of the deep loosening tine.

In accordance with the invention drill coulters are carried on the frame in spaced relationship relative to an associated deep loosening tine, such that the drill coulters are provided behind the deep loosening tines relative to the direction of travel. The drill coulters are in an 'aligned' or fixed spatial relationship with an associated deep loosening tine in that each deep loosening is in a fixed lateral spatial relationship with at least a pair of coulters. However, a drill coulter pair is provided behind the middle deepest point of deep loosening tine (relative to the direction of travel when in use) in such manner that each coulter of the pair is laterally spaced to either side of the deepest point of the deep loosening tine rather than being positioned directly behind the tine, (relative to the direction of travel when in use).

In use, first contact with the soil is made by each deep loosening tine. Each deep loosening tine is supported such that a soil working formation such as a pointed/bladed portion thereof drives through the soil surface in a direction of travel of the frame. Such an arrangement of deep loosening tines provides a parallel array of wide troughs through the soil when in use which is cultivated to a desired relatively deep desired first depth.

The spaced and offset aligned pairs of drill coulters behind the deep loosening tines make subsequent contact with the loosened soil offset from a mid line of the trough, for example at a desired second depth which may be substantially less than the deepest point of the rough. This allows for two or more rows of seeds to be sown simultaneously in each trough. Seeds can be sown at a depth and at a lateral density which is not determined primarily by the working depth and spacing of the deep loosening tines. This may place the seed in a more optimised position for subsequent germination and with a more optimised row spacing. The trough provides a lower region of disturbed soil below the seed row area, results in improved drainage of soil immediately surrounding a sown seed. All of these factors will desirably result in increased yields of crops and other plants. It achieves both deeper level cultivation and seed drilling in a single pass thus allowing for time and energy saving benefits.

Preferably the degree of offsetting of a drill coulter from a line defined by the mid line of the deep loosening tine relative to which the coulter is laterally aligned can be varied and thus allows for a larger level of control of placement of the resulting seed rows when in use.

In accordance with the invention a deep loosening tine is associated with at least one pair of coulters in the above described aligned manner.

Typically, each deep loosening tine is associated with at least one pair of coulters in the above described aligned manner. Optionally, more than two coulters may be associated with a given deep loosening tine. For example plural pairs of coulters may be associated with each deep loosening tine. For example the apparatus is provided with two pairs of drill coulters for each deep loosening tine. Alternatively, the apparatus is provided with three pairs of drill coulters for each deep loosening tine.

Preferably, the deep loosening tine is adapted to cultivate and break the soil profile. For example, preferably the tine is designed to operate at a depth of between 100 and 450 mm and more especially between 150 and 250 mm, and is preferably provided with height adjustment means to adjust the tine height relative to the frame within such a range.

The deep loosening tine may have a relatively wide profile, for example presenting a width of at least 10 mm in a movement direction. Preferably the deep loosening tine comprises an elongate leg which is provided, for example at a base portion designed to be below a soil surface during use, with soil working formations which result in a wide, relatively shallow depth trough in to which two or more seed rows can be introduced.

The deep loosening tine preferably presents a forwardly directed point in a movement direction towards the bottom thereof. The tine preferably presents a bladed soil working formation, at least towards the bottom thereof. For example, paired bladed surfaces are provided to enhance the cutting action of the tine as it is drawn through the soil when in use.

Typically, the deep loosening tines thus each comprise knife or slotter tines which can be adjusted independently for depth of work. Such tines may provide a soil cultivation role in that they break the soil to the desired depth, create drainage, remove compaction and aerate the soil which is essential for heavy crop growth.

Preferably, the deep loosening tine is so designed to avoid the need for prior cultivation altogether. Such tines suitable for cultivation of land carrying scrub/debris from a previous season's growth are known, for example being referred to as sub-soiler or mole plow legs, and are particular favourable for use in the present apparatus, as they may reduce or avoid the need for the soil to be pre-ploughed.

In a preferred embodiment the penetration depth of the deep loosening tines is adjustable relative to the frame. In such an embodiment, the penetration depth of the soil working portions associated with the drill coulters may be kept fixed relative to the frame or may be separately adjustable. This allows adjustment of the relative penetration depth of the deep loosening tines and drill coulters and in particular allows the adjustment of the penetration depth of the deep loosening tines to be significantly below that of the drill coulters to work the soil to a lower depth before seed drilling.

When in use the deep loosening tines may strike obstructions, such as stones or root bundles. Therefore it may be preferred to provide the deep loosening tines with a trip mechanism in conjunction with a mounting hinged and adapted to allow the tine to hinge backwards in the event an obstruction is encountered. The trip mechanism preferably includes means to urge the tine back into a usual and for example generally vertical cutting configuration, and for example comprises hydraulic means to effect this.

Preferably, the drill coulters consist of a soil working portion such as a tine and/or disc and a rearwardly located seed delivery portion. The soil working portion is preferably configured to create a shallower, narrower planting furrow in the loosened trough. Preferably, the soil working portion is configured to create a single planting furrow into which the seed delivery portion may deliver a row of seeds in use.

One possible soil working portion of a drill coulter comprises a tine portion which works on the disturbed and broken soil in the trough worked by the deep loosening tines to create a secondary planting furrow into which seed can be delivered. The tine portion is conveniently bladed, and for example includes lateral wings which lift the disturbed and broken soil in the trench worked by the deep loosening tines as the drill coulters move therethrough, and thus to allow seed to fall below the lifted soil into secondary furrows which, as the second tines continue to move forward, falls back to cover the seed.

Additionally or alternatively the soil working portion comprises a cutting disc which works on the disturbed and broken soil in the trough worked by the deep loosening tines to create a secondary planting furrow into which seed can be delivered, for example in conjunction with and acting immediately ahead of a drill coulter tine The seed delivery portion provides an outlet for the seed to be introduced into the secondary planting furrow. This may be provided by any known means. Preferably, each soil working portion is provided in conjunction with a single seed delivery portion to deliver seed into a single planting furrow. The soil working portion is correspondingly configured to create a single planting furrow into which the seed delivery portion may deliver a row of seeds in use. In an alternative arrangement, a single soil working portion is configured to create plural planting furrows and the seed delivery portion is adapted to deliver a row of seeds into each such furrow in use, such that each drill coulter results in plural seed rows per one pass of the apparatus when in use, for example such that each pair of drill coulters sows four rows of seed in one pass, when in use.

More completely, the apparatus may comprise a seed supply and delivery means, in communication with the drill coulter seed delivery portion, to form a feed system. The communication can be achieved by any known means. A feed system can be provided individually for each drill coulter, or alternatively can be in a form having many delivery lines fed from one large hopper containing seed feedstock, mounted upon the apparatus frame, and positioned above the drill cultures. The latter arrangement is preferred. In addition, the feed system may be a gravitational feed system or a pneumatic feed arrangement, etc, as known in the art.

In a preferred mode of operation, some or all of the deep loosening tines are adjusted so that the soil working portions of the drill coulters penetrate to only part of the depth penetrated by the deep loosening tines. In use this, in combination with the relative alignment, means that each deep loosening tine creates a relatively deep and wide trench in the worked soil, and its associated pair(s) of drill coulters drill seed nearer to the top of each worked trough.

In addition the apparatus may desirably comprise soil levelling means. Suitably the frame may carry an array of soil levelling means to level the soil in the furrowed regions over the sown seed. The soil levelling means may be located in fixed alignment with the deep loosening tines and/or with one or more adjacent drill coulters. In a convenient embodiment, each deep loosening tine has an associated pair of soil levelling means disposed either side of the mid line of the trough created thereby in use, and optimally therefore in direct fore and aft alignment with the coulters.

In a preferred embodiment, the array of soil levelling means comprises an array of soil levelling wheels with a relatively wide profile, for example being at least 20 mm wide, and for example being tyred, since the purpose of these wheels is to level the surface rather than to penetrate it to any excessive degree. They act so that as the apparatus moves in a movement direction, soil that has been disturbed by the apparatus is generally flattened by the passage of the levelling means across the disturbed soil (and hence generally consolidated over the drilled seed).

Soil levelling means may also be provided in a train formation between the deep loosening tines and the drill coulters, for example press wheels may be provided in between the deep loosening tine, and the drill coulters, if a degree of pre-seed sowing compaction is desirable.

The use of wheels as levelling means is particularly convenient, as it is also helps to set the working height of the frame.

In accordance with this aspect of the invention, the frame is adapted to be drawn across a soil surface to be planted with seed, for example being provided with means to attach a frame to the rear of a tractor or the like, or with suitable self propulsion means, in such manner that each series of ground working items or elements carried on the frame in train is able to make contact with the ground successively, and work the ground surface.

The series of ground working elements are thus carried in successive order as deep loosening tines; optional soil levelling means; drill coulter including secondary soil working means plus seed feed means; optional soil levelling means. Each array of ground working elements may be a linear array, for example in a direction perpendicular to a movement direction of the frame, but this is not a necessary requirement of the invention. In another possible embodiment spaced apart rows of ground engaging elements are conveniently arranged in parallel spaced apart V formations, with a forward most point of the V generally at a midline of the frame. In another possible arrangement the spaced apart rows comprise linear rows but angled away from an angle directly perpendicular to a movement direction. An array of a particular ground working element may be provided a single row or in multiple rows, subject to the general proviso that the various ground working elements are relatively disposed in such manner that contact with any given part of a worked soil substrate is in the required order. An array may be in a staggered arrangement, in that a ground working element in an array is offset in a fore and aft direction relative to its neighbours to produce a relative stagger. For example to accommodate multiple drill coulters behind each associated deep loosening tine in compact manner it might be desirable to arrange drill coulters on the frame in plural rows and/or with such fore and aft offset. Combinations of any and all such arrangements can be envisaged provided they do not depart from the principle that the arrays of ground working elements are disposed successively in spaced apart series in such manner that in a movement direction the ground is worked successively by the elements as described.

The frame may be adapted for attachment to a tractor or the like to be driven across a ground surface in use. For example, the frame may be adapted to be carried via a 3-point linkage at the rear of the tractor. In particular, the linkage is adapted so that the overall height of the frame an angle of inclination thereof relative to the ground can be adjusted in suitable manner and for example hydraulically.

In a preferred embodiment combining the above, the depth and angle of operation is thus determined by the interaction of the height of the rear wheels, the adjusted height of the deep loosening tines, and the load applied via this hydraulic linkage.

Additional road wheels may be attached to the frame and adapted to be raised or lowered as required to allow the apparatus to be driven on a road but to be stowed out of the way with the seed drilling apparatus in use.

The road wheels may be removable. Deployment of these wheels may be by any suitable system.

In a further embodiment of the present invention there is provided a method of cultivating soil and sowing seed in one pass which comprises the steps of:

working a soil surface by drawing deep loosening tines through the soil to be worked to work the soil to a first depth and create a plurality of troughs;

drilling seed by drawing a array of drill coulters through the broken up soil, to work a planting furrow to a second depth less than the first depth to introduce seed into the planting furrow;

wherein at least one pair of drill coulters is drawn in relative alignment to an associated deep loosening tine in such a manner that each coulter of the pair is laterally offset either side of the mid line of the trough created by the deep loosening tine.

A preferred first depth is at least 100 mm and for example at least 250 mm. A preferred second depth is less than 100 mm.

Preferably the method also provides a final step of soil levelling, such that the soil is levelled over the sown seed. This is desirably achieved by levelling wheels, although any known means can be employed, for example, levelling blades may be employed.

The method of "pulling" is desirably achieved by conventional towing behind a tractor.

The method in particular comprises drawing ground contacting/working elements above described in the order described across a surface by mounting a series of each on a suitable framework with a suitable lateral spacing in a movement direction, and drawing the framework over the soil so that each of the soil engaging elements engages and works the soil in manner above described. The method in particular thus comprises use of the apparatus hereinabove. Further preferred features of the method will be understood by analogy with the description of the apparatus hereinabove.

The invention will now be described by way of example only with reference to FIGS. 1 to 7 in which, FIG. 1 is an embodiment of the invention in side elevation;

Figure 1:
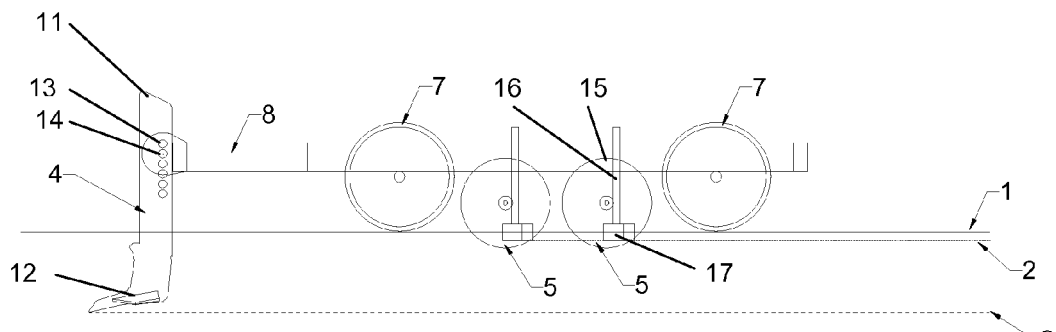

An embodiment of an apparatus in accordance with the invention is presented which comprises a serial train of ground working elements mounted upon a common frame, and adapted to be drawn over and through the surface of soil to be worked by linking to a suitable tractor or the like. The embodiment is shown in side elevation in FIG. 1 and in plan view in FIG. 2.

The soil working elements are, in a direction of travel in use, a deep loosening soil working tine 4, a first depth/press wheel 7 for soil levelling, a drill coulter or seed boot 5, and a second depth/soil levelling wheel 7. These are mounted on a framework structure 8.

The framework 8 is adapted for linkage to a suitable towing vehicle such as a tractor or the like by means of the 3-point linkage which may include adjustment means such as hydraulic ram (not shown). Adjustment of the adjustment means allows the downward force and angle of the frame relative to the ground in use to be adjusted, for example to accommodate different ground conditions. Operation of the adjustment means sets the contact configuration in particular in conjunction with the contact point made by the circumference of the rear wheel 7, and the deep level tine 4 is also height adjustable. Together, these set the deep loosening tine to a level 9, to provide a desirable trough depth at this level when in use.

In use, the entire apparatus is drawn across a soil surface such that the soil working elements 4, 7, 5, 7 are brought to bear on the surface in serial manner as above described.

First contact is made by the deep loosening tine 4. These tines are intended to break up the soil to a required depth, reducing compaction, aerating, and creating drainage channels which are necessary for healthy crop growth. These are in practice at least 10 mm wide, and are intended to penetrate to a depth of at least 100 mm and for example at least 250 mm.

The length of a body portion 11 of the tine 4, and thus the depth of the working blade 12, are adjustable by means of the pin 13 and holes 14. In this way, different desired working depths for the initial furrow can be achieved. However, it is usually preferable that the working depth of the tines 4 is substantially deeper than that of the drill coulters 5 to work and loosen the soil initially to a substantial depth.

A tine may strike an obstacle within the soil, such as a large stone or the like. Conveniently therefore, each deep level tine is provided with a hinge mechanism adapted to trip in the event of such a blockage, and allow the tine to flick backwards until the blockage is clear. A hydraulic mechanism (not shown) may urge each tine back into its normal general vertical position.

Spaced behind the deep loosening tines 4, is an array of drill coulters or seed boots 5. The design of these will be generally familiar, in that they include a soil working portion and a seed drilling portion in familiar manner. The seed drilling portion is located behind the soil working portion and is adapted to deliver seed via suitable hydraulic delivery means (not shown) from supply in a hopper (not shown) to the trough created by the deep tine 4 and the soil working portion of the coulters.

In the illustrated arrangement, two rows of coulters are provided behind the row of deep loosening tines, relatively staggered. This may be useful in accommodating multiple seed rows with close lateral spacing behind an associated deep loosening tine.

The drill coulter in the illustrated embodiment comprises two soil working elements in the form of both a tine and a disc. First contact with the soil is made by a cutting disc 15. A tine comprising a soil working formation 17 at the base of a rigid leg 16 this then creates a planting furrow in the loosened soil into which seed can be delivered. Seed delivery means spaced immediately rearwardly behind the soil working elements deliver seed into this furrow. As described above, the drill coulter 5, is aligned and off set relative to the deepest point of the trough/tine 3

Two important features of the relative arrangement of the deep loosening tines and the drill coulters are illustrated in the figures.

First, as is particularly shown in FIG. 1, the deep loosening tine is drawn through the soil to a depth 9 which is significantly greater than the depth 2 of the seed planting furrow created by the drill coulter. The deep loosening tine thus create a V shape of cultivated loosened soil allowing a number of seed rows to be planted in the V in such manner that they are able to put roots down relatively easily because of the reduction of compaction in the disturbed V of soil.

Figure 2:
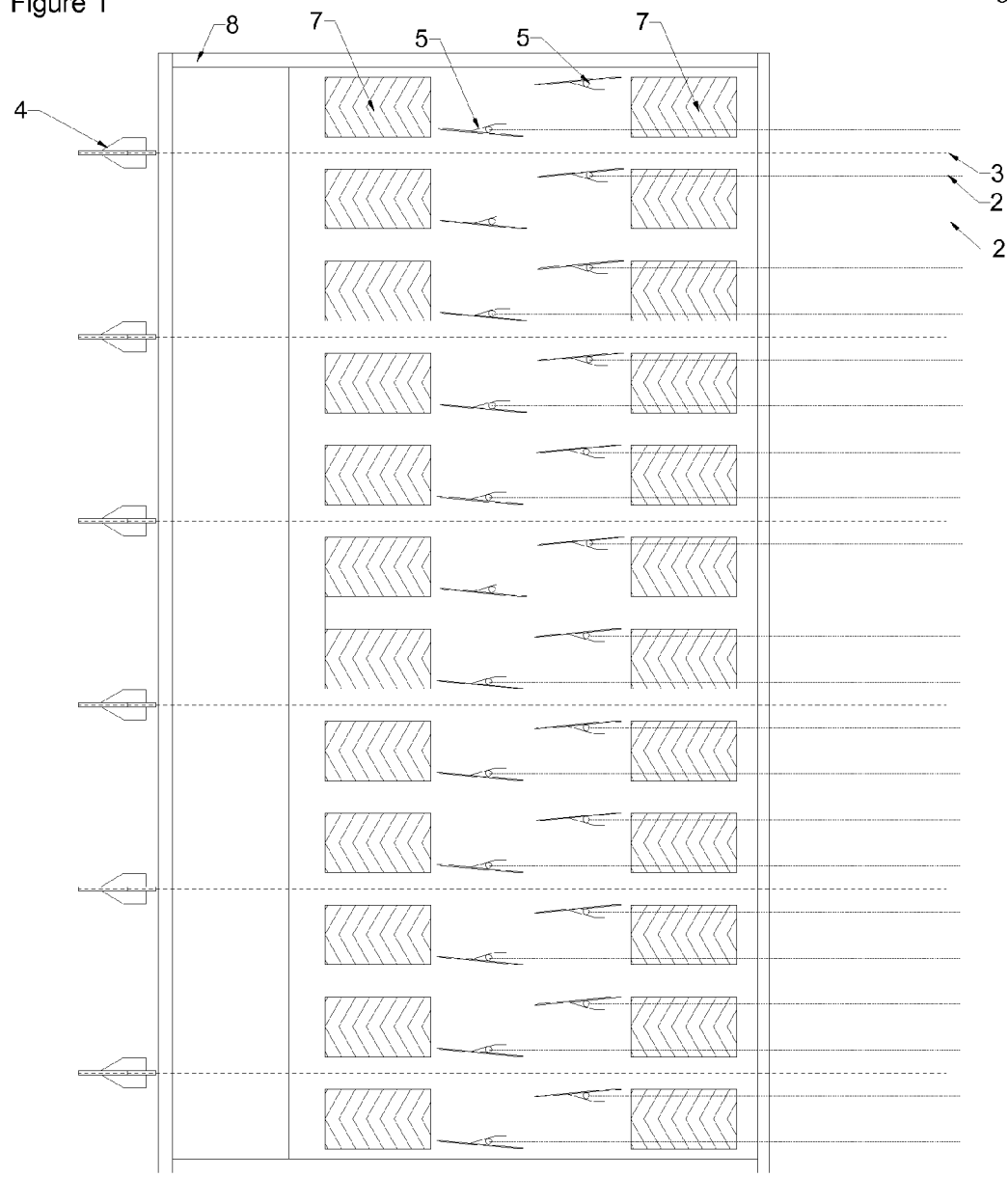
FIG. 2 is the embodiment of FIG. 1 in plan view.
Figure 3:
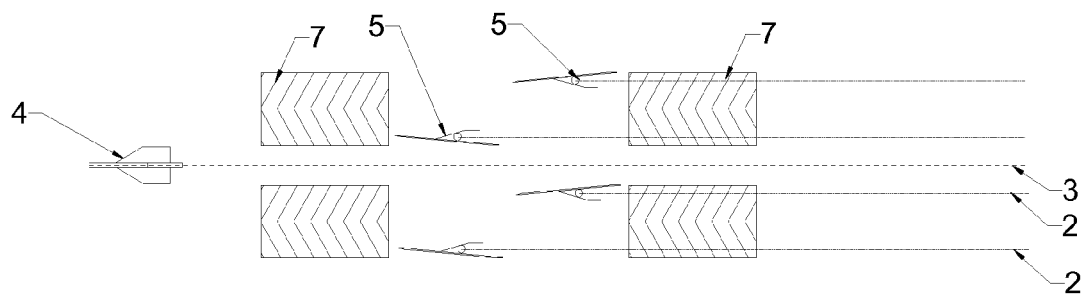
FIG. 3 is a detailed plan view illustrating the alignment of additional components behind an individual deep loosening tine in FIG. 2.

Second, as it is illustrated in FIGS. 2 and 3, one or more pairs of drill coulters, and in the illustrated embodiment two pairs of drill coulters, are provided with an alignment behind and laterally offset relative to the deep losing tine in such manner that one of each such pair of coulters is located to sow seed in a row disposed to either side of a centre line 3 of area worked by the deep loosening tine. This arrangement is particularly illustrated in FIG. 3, where the alignment of two pairs of drill coulters behind a single deep loosening tine 4 is illustrated in the manner described.

This arrangement of multiple coulters associated with each single deep loosening tine in an offset manner confers particular advantages over an arrangement where a single coulter is aligned directly behind a single deeper loosening tine. It enables the depth level 9 at which the deep loosening tine 4 operates to be separately adjustable from, and relatively much deeper than, the depth 2 of the furrow worked by each individual drill coulter 5. It enables the V shaped trough of disturbed soil created by the deep loosening tine to be relatively wide, whilst still providing a plurality of drilled seed rows across that width. A number of the problems which would arise in directly aligned systems from the necessary compromise between the desire to loosen soil to a significant depth to eliminate compaction, and the desire to drill seed rows close together to maximise yield, and to sow seed rows at a shallower depth, can be avoided.

Figure 4:
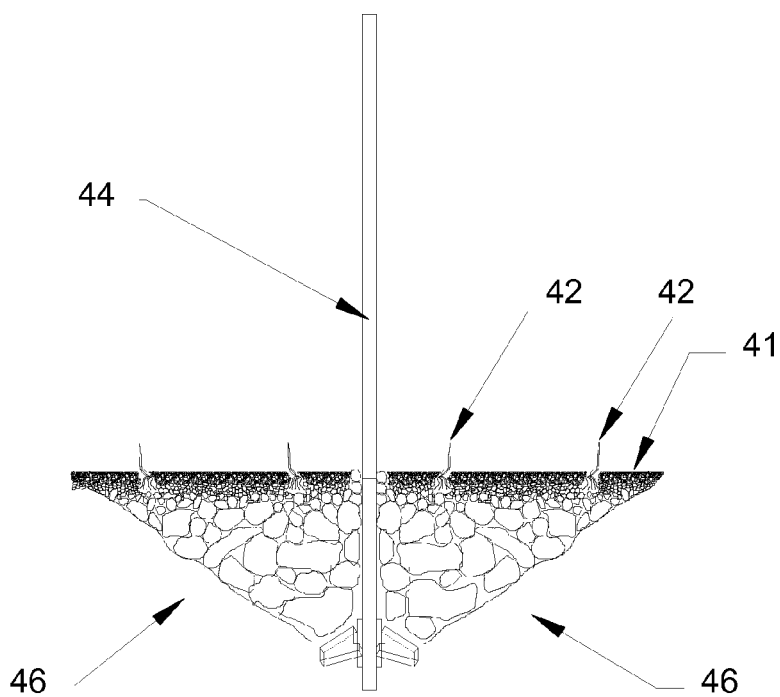
FIG. 4 is a schematic representation of the cultivation effect of the deep loosening tine of FIGS. 1 to 3.

The result is illustrated in FIG. 4. A deep loosening tine 44 is shown with a depth adjustable leg and a soil working bladed formation at the base. This tends to loosen the soil in a generally V shaped trough in familiar manner as illustrated, to create a loosened soil portion 41 with unworked soil 46 beyond. The embodiment of FIGS. 1 to 3 sows four seed rows in generally evenly spaced manner across the breadth of this V of loosened soil. Alternative arrangements might for example sow two or six rows following each deep losing tine. In accordance with the invention it is therefore possible to combine several components to achieve a machine capable of repairing soil to create a loosened profile and placing the seed in one pass, while disturbing the ground surface as little as possible, therefore reducing fuel usage and the cost of producing the crops.

Fertiliser may be placed down the back of the deep loosening tine leg, for example via suitable fertiliser supply means in combination with the leg, to create a food source for the growing plants. It is advantageous that this is provided at the deep loosened soil trough level, and is provided in offset alignment to an individual seed row.

The other soil working elements in the train are first and second arrays of support and soil levelling wheels 7. These comprise wheeled structures mounted on an axle on the frame 8 and provided with a relatively wide circumferential profile, of at least 25 mm, for example by means of a tyre. The purpose of these wheels is twofold. First, they effect some levelling and compaction or consolidation of the soil where seed has been planted, and are preferably aligned suitably in line with the serial arrays of coulters and generally over the furrows created thereby in order to effect this. As illustrated, in more detail in FIG. 3, the rows created by two adjacent coulters 5 on one side of a deep tine 4 has an associated wheel. Secondly they support the frame and partly determine the working height. In the illustrated embodiment, wheels are provided for this levelling function, but some or all of them may be replaced by other soil levelling means, such as for example soil levelling tines or the like which will be familiar from other apparatus in the art.

Figure 5:
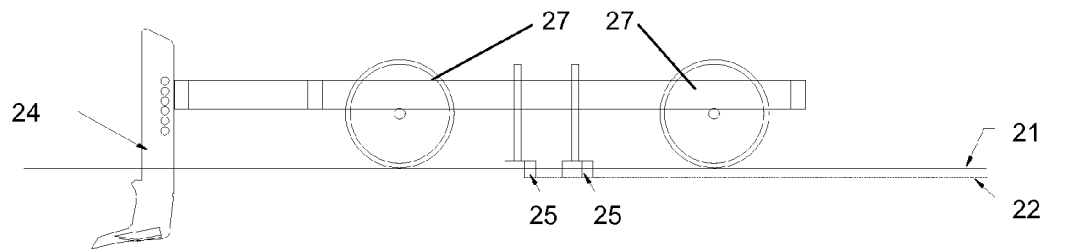
FIG. 5 is a side elevation of a second embodiment of the invention.
Figure 6:
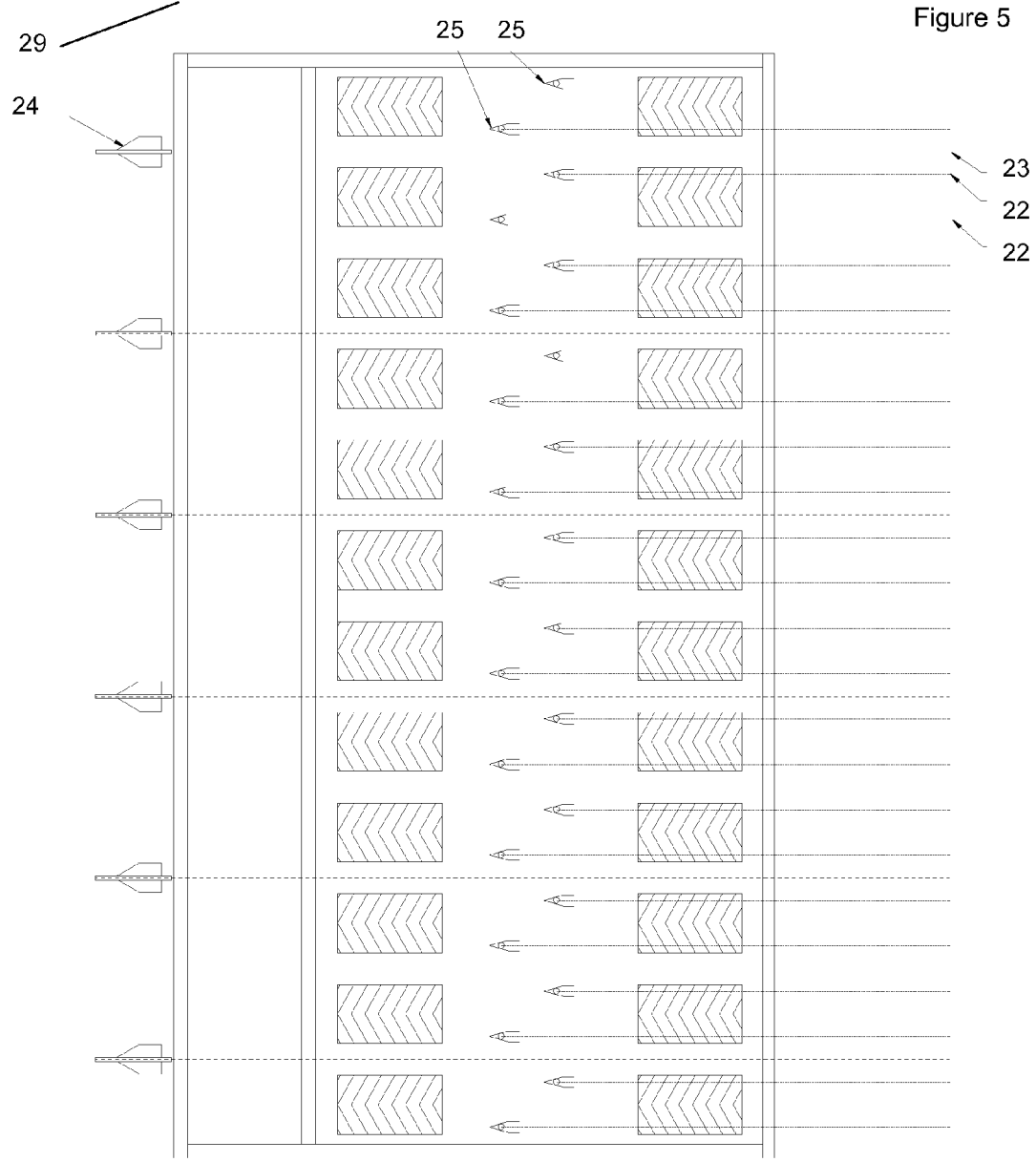
FIG. 6 is a plan view of a second embodiment of the invention.

An alternative embodiment of apparatus in accordance with the invention is illustrated in FIGS. 5 to 7, again respectively shown in side elevation, in plan view, and in detailed plan view showing the alignment of an individual deep loosening tine and four coulters. This embodiment differs from the previous embodiment in that the soil working formation of each coulter 25 takes the form of a bladed tine structure only, and cutting discs are not present. Otherwise, the arrangement is generally similar to that above described.

Figure 7:
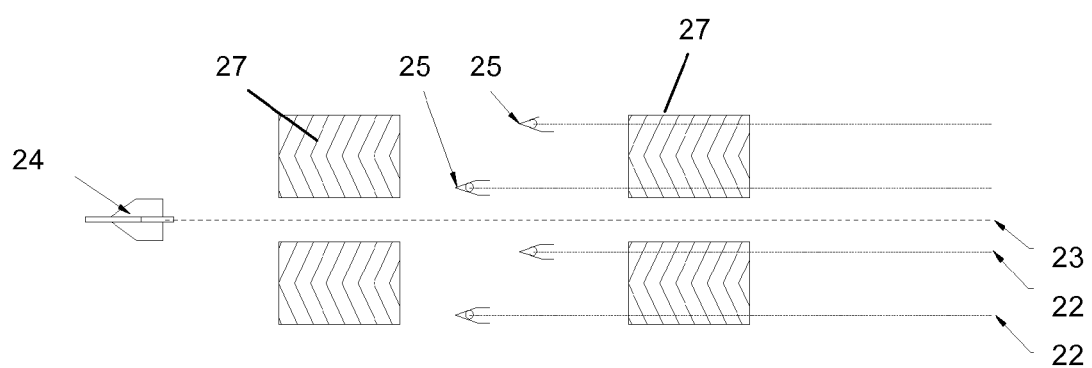
FIG. 7 is a detailed plan view of the alignment of elements of the second embodiment of the invention.

The apparatus is drawn over and through the soil in similar way with first contact being made by a deep loosening tine 24 set by adjustable means on its leg portion to a desired depth 29. Behind each deep loosening tine, in the manner illustrated in FIG. 7, are provided a first series of tyred soil levelling wheels 27 to consolidate the losing soil immediately behind the tine 24, four coulters 25 offset aligned in like manner to the first embodiment, and a second series of tyred soil levelling wheels 27 behind the coulters. Again, the effect of using the apparatus is to sow four rows of seed in the manner illustrated in FIG. 4 in each V shaped cultivated trough created by the deep losing tine 24.

The apparatus presents a combination of elements in serial array which has not previously been provided by the prior art, and which provides for an improved seed drilling operation, particularly on difficult surfaces where the surface has not otherwise been subject to significant cultivation since harvesting of a previous growth cycle, and where therefore significant vegetative debris and/or weed-growth or re-growth combine to create a relatively consolidated initial surface that does not lend itself so readily to efficient working by prior art drill apparatus.

The invention claimed is:

1. An apparatus for cultivation of soil and planting of seeds, the apparatus comprising:
    a frame;
    a row of deep loosening tines carried by the frame, each deep loosening tine of the row of deep loosening tines comprising an elongate leg provided with a soil working formation at a base portion of the elongate leg;
    wherein, in use, the soil working formation drives through a soil surface to operate at a first depth of 100-450 mm;
    wherein the row of deep loosening tines is spaced across at least a major part of a width of the frame;
    an array of drill coulters carried by the frame and spaced across at least a major part of the width of the frame;
    wherein each of the deep loosening tines has positioned therebehind and associated therewith a plurality of pairs of drill coulters of the array of drill coulters; and
    wherein each drill coulter of a given pair of the plurality of pairs of drill coulters is laterally offset a same distance on either side of a deep loosening tine associated therewith.

2. The apparatus in accordance with claim 1, wherein each pair of drill coulters of the plurality of pairs of drill coulters is supported on the frame so as to make subsequent contact with loosened soil at a second depth, the second depth being substantially less than the first depth.

3. The apparatus in accordance with claim 1, wherein said each deep loosening tine is associated with two pairs of drill coulters.

4. The apparatus in accordance with claim 1, wherein each deep loosening tine of the row of deep loosening tines is adapted to operate at a depth of between 150 mm and 450 mm.

5. The apparatus in accordance with claim 1, wherein a deep loosening tine is provided with height adjustment means to adjust a tine height relative to the frame.

6. The apparatus in accordance with claim 1, wherein a deep loosening tine presents a width of at least 10 mm in a movement direction.

7. The apparatus in accordance with claim 1, wherein a deep loosening tine presents a forwardly directed point and a bladed soil working formation comprising paired bladed surfaces towards a bottom thereof.

8. The apparatus in accordance with claim 1, wherein a deep loosening tine is provided with a trip mechanism in conjunction with a mounting hinged adapted to allow the deep loosening tine to hinge backwards in the event an obstruction is encountered.

9. The apparatus in accordance with claim 1, wherein a drill coulter comprises a soil working portion and a rearwardly located seed delivery portion.

10. The apparatus in accordance with claim 9, wherein the rearwardly located seed delivery portion provides an outlet for seed to be introduced into a secondary planting furrow created in use by the soil working portion of the drill coulter.

11. The apparatus in accordance with claim 9, further comprising a seed supply and delivery means, in communication with the rearwardly located seed delivery portion, to form a feed system.

12. The apparatus in accordance with claim 1, further comprising soil levelling means carried on the frame to level the soil in furrowed regions over sown seed in use.

13. The apparatus in accordance with claim 12, wherein the soil levelling means comprises an array of tyred soil levelling wheels at least 20 mm wide.

14. A method of cultivating soil and sowing seed in one pass, the method comprising:
    drawing a row of deep loosening tines through soil to work the soil to a first depth of between 100 and 450 mm and create a plurality of troughs;
    wherein each deep loosening tine of the row of deep loosening tines comprises an elongate leg carried by a frame and provided with a soil working formation at a base portion of the elongate leg;
    drilling seed by drawing an array of drill coulters through the soil worked by the row of deep loosening tines to work a planting furrow to a second depth that is less than the first depth to introduce seed into the planting furrow;
    wherein each deep loosening tine of the row of deep loosening tines has positioned therebehind and associated therewith a plurality of pairs of drill coulters of the array of drill coulters; and
    wherein a given pair of the plurality of pairs of drill coulters is in relative alignment to an associated deep loosening tine of the row of deep loosening tines in such a manner that each drill coulter of the given pair is laterally off set either side of a mid line of a trough of the plurality of troughs created by a deep loosening tine associated therewith.

* * * * *